United States Patent [19]

Brüggendieck et al.

[11] 4,392,714
[45] Jul. 12, 1983

[54] OVERHEAD POWER CABLE HAVING LIGHT CONDUCTING FIBERS ARRANGED IN ITS INTERIOR

[75] Inventors: Siegfried Brüggendieck, Radevormwald; Karl-Heinz Nolting, Cologne; Friedrich Krahn; Gerhard Olejak, both of Bergisch Gladbach, all of Fed. Rep. of Germany

[73] Assignee: U.S. Philips Corporation, New York, N.Y.

[21] Appl. No.: 256,347

[22] Filed: Apr. 22, 1981

[30] Foreign Application Priority Data

Apr. 24, 1980 [DE] Fed. Rep. of Germany ....... 3015732

[51] Int. Cl.$^3$ ............................................. G02B 5/172
[52] U.S. Cl. ................................................. 350/96.23
[58] Field of Search .................... 350/96.23; 174/70 R

[56] References Cited

FOREIGN PATENT DOCUMENTS

| 2604766 | 8/1977 | Fed. Rep. of Germany ... 350/96.23 |
| 2733607 | 2/1979 | Fed. Rep. of Germany ... 350/96.23 |
| 2239742 | 3/1975 | France . |
| 54-36741 | 3/1979 | Japan ................................. 350/96.23 |
| 2029043 | 3/1980 | United Kingdom ............ 350/96.23 |

OTHER PUBLICATIONS

Gladenbeck et al., "Optical Fiber Cable for Overhead Line Systems", *6th Eur. Conf. On Opt. Comm.*, York, G. B., Sep. 1980, pp. 359-362.
Igarashi et al., "Composite Fiber-Optic Overhead Ground Wire", *Proc. of Int. Wire & Cable Symp.*, Nov. 1980, pp. 312-321.
Maddock et al., "Optical Fibres In Overhead Power Transmission . . .," *Proc. of Int. Wire & Cable Symp.*, Nov. 1980, pp. 402-409.

*Primary Examiner*—John D. Lee
*Attorney, Agent, or Firm*—Marc D. Schechter

[57] ABSTRACT

The invention relates to an overhead power cable for the simultaneous transmission of electrical energy and data signals. The cable has one of more layers of electrically conductive wires. Inside these layers, light conducting fibers are provided. Each fiber has a mantle of synthetic resin. Furthermore, all fibers are surrounded by a common sheath of synthetic resin. According to the invention the light conducting fibers are stranded with or around one or more strength members with a strand-length from 5 to 15 times the diameter of the strand. Furthermore the core of fibers and wires is provided with a band of synthetic resin within the sheath. A seamless metal shield is arranged between the sheath of synthetic resin and the wire layers.

2 Claims, 2 Drawing Figures

OVERHEAD POWER CABLE HAVING LIGHT CONDUCTING FIBERS ARRANGED IN ITS INTERIOR

BACKGROUND OF THE INVENTION

The invention relates to an overhead power cable for the simultaneous transmission of electrical energy and data signals. The cable comprises one or more layers of electrically conductive wires. Inside the layers of conductive wires, the cable comprises light conducting fibers which are each provided with a mantle of synthetic resin. The fibers are all surrounded by a common sheath of synthetic resin.

Such a cable may be used in overhead power systems for the transmission of electrical energy. This cable is particularly suitable as a high voltage cable.

French Pat. No. 2,239,742 discloses an aerial cable having a data transmission system of light conductors (optical fibers) arranged in the interior of a supporting member. The light conductors are surrounded by a sheath of synthetic resin on which wires are wound helically. The supporting member is a high voltage phase cable.

The above French Patent is based essentially on the idea of using a wire cable comprising light conducting fibers as a high voltage phase cable, and it indicates that the light conducting fibers must be protected by a sheath of synthetic resin against mechanical load exerted on the cable during manufacture, laying, and operation. Suggestions for a practically useful construction of such a cable are not given in the French Patent.

SUMMARY OF THE INVENTION

It is an object of the present invention to provide an overhead power cable in which the optical fibers are fully protected against a number of stresses and against moisture and which is easy and inexpensive to manufacture and use.

According to the invention this object is achieved in that the light conducting fibers are stranded with or around one or more strength members with a strand length from 5 to 15 times the diameter of the strand. Moreover, the core (comprising the fibers and wires or strength members) is covered with a band of synthetic resin. A seamless metal sheath is provided between the sheath of synthetic resin and the outer wire layers (1).

In a favorable embodiment, the sheath (2) of synthetic resin surrounding the band of synthetic resin consists of high-density polyethylene.

The advantages of the invention consist, in particular, of the discovery that with the comparatively simple construction described a safe and sure protection of the comparatively sensitive optical fibers can be achieved for a long period of time. The protection for a long period of time in particular against thermal stresses is further improved by the choice of the material for the synthetic resin sheath and the seamless metal sheath.

The strength members may comprise a bundle of high strength wires such as a bundle of polyamide wires (Trade name Kevlar). If desired, the bundle may be arranged in a matrix of a synthetic resin such as an epoxide resin. Another example of a strength member is a bundle of glass fibers in a matrix of a synthetic resin such as polyester.

BRIEF DESCRIPTION OF THE DRAWING

FIG. 1 is a cross-sectional view of an overhead power cable of the type described above. In FIG. 1, a layer of metal wires 1 is shown. Wires 1 are used to transmit high voltage electrical energy, and consequently they consist preferably of copper or aluminium. They are stranded around a sheath 2 of a synthetic resin obtained by an extrusion process.

Figure 1:
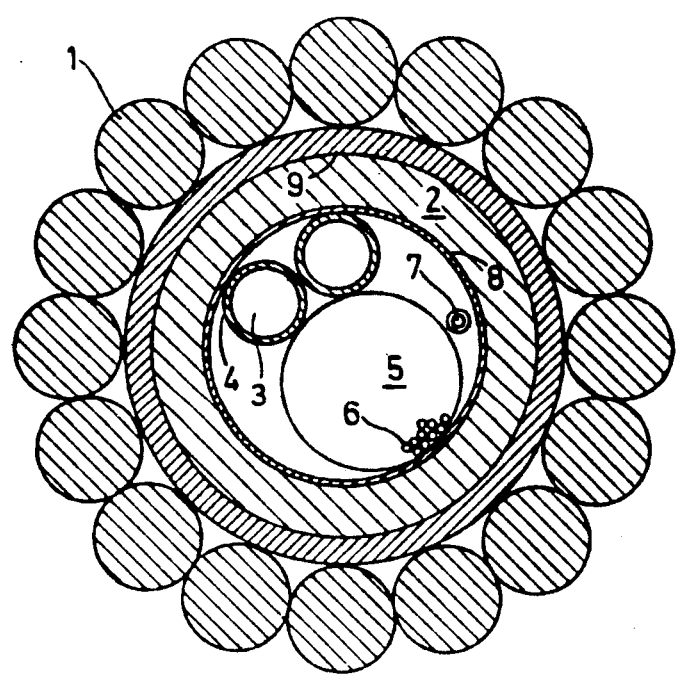
FIG. 1 is a cross-sectional view of a cable according to the invention.

Inside the sheath 2 of synthetic resin, which preferably consists of a high-density polyethylene, light conducting fibers 3 are provided. Fibers 3 are each surrounded by a mantle 4 of synthetic resin. The light conducting fibers 3 may be arranged loosely within mantle 4, as is shown in the drawing. Alternatively, they may have a mantle directly applied over the surface of the fibers.

The fibers 3 with their mantles 4 of synthetic resin are stranded with a short strand together with a bundle 5 of high-strength wires 6. It has been found that a strand length between 5 and 15 times the strand-diameter gives the most favorable results for the end in view.

The stranded fibers 3 with their mantles 4 of synthetic resin together with the bundle 5 of high-strength wires 6 of synthetic resin form a core 7 of the overhead power cable. Core 7 is surrounded by a band 8 of synthetic resin which serves to prevent adhesion of sheath 2 to the core 7 particularly during manufacture of the cable. Band 8 of synthetic resin thus consists preferably of polystyrene or of a known flourine-containing synthetic resin.

A closed seamless metal sheath 9 is provided for example by means of extrusion, over sheath 2 of synthetic resin and below the layer of wires 1. It preferably consists of the same material as wires 1 and protects the inner construction of the cable quite reliably against moisture, The metal sheath 9 furthermore improves the active conductor cross-section of the cable so that at a given power transmission the diameter of the cable may be reduced due to the presence of the metal sheath 9.

Figure 2:
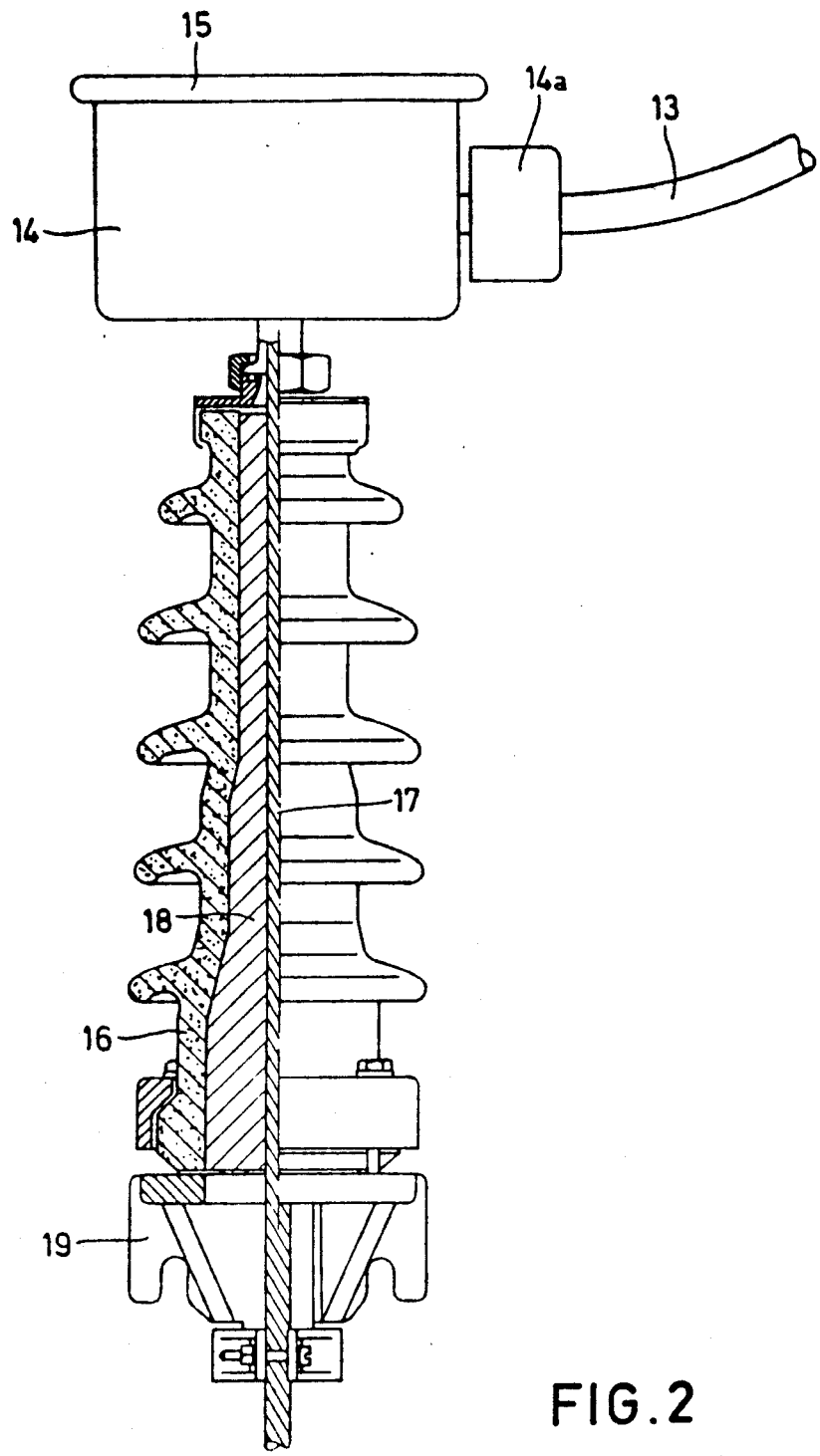
FIG. 2 is a schematic diagram, partly in cross-section, of an overhead power cable with a cable fitting.

FIG. 2 schematically shows the overhead power cable represented in FIG. 1 with a cable fitting. The overhead power cable is denoted by 13. It comprises a connection terminal 14a via which the energy is transmitted. The end of the cable 13 projecting via the connection terminal 14a is connected to a master fitting 14 in which it is mechanically safely secured. In the interior of the master fitting 14 the light conductor fibers (not shown) in the overhead cable 13 are accessible and are spliced with the subsequent light conductor cable 17. After making the connections, the interior of the master fitting 14 is molded with a molding resin and sealed in an airtight and watertight manner by the cover 15.

The master fitting 14 is supported by a supporting insulator 16 known per se which in turn is connected to a connection collar 19. The optical cable 17 extends from the master fitting 14 through the interior of the supporting insulator 16 to the data apparatus not shown in FIG. 2. The interior of the supporting insulator 16 is advantageously molded with a synthetic resin 18 after assembly. A preferred molding mass is a silicone-containing synthetic resin.

What is claimed is:

1. An overhead power cable for simultaneously transmitting electrical energy and data signals, said cable comprising:
   at least two light-conducting fibers, each fiber being provided with a mantle of synthetic resin;
   at least one strength member, said light-conducting fibers being stranded with or around the strength member to produce a core having a strand length and strand diameter, the strand length being from 5 to 15 times the strand diameter;
   a band of synthetic resin provided around the core;
   a sheath of synthetic resin provided around the band of synthetic resin;
   a seamless metal sheath provided around the sheath of synthetic resin; and
   at least one layer of electrically conductive wires provided around the seamless metal sheath.

2. An overhead power cable as claimed in claim 1, characterized in that the sheath of synthetic resin consists of high-density polyethylene.

* * * * *